(12) United States Patent
Lee

(10) Patent No.: US 10,444,868 B2
(45) Date of Patent: Oct. 15, 2019

(54) MULTIFUNCTIONAL STYLUS WITH A VOICE CONTROL FUNCTION AND VOICE CONTROL METHOD APPLIED THEREIN

(71) Applicant: Cheng Uei Precision Industry Co., Ltd., New Taipei (TW)

(72) Inventor: James Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 101 days.

(21) Appl. No.: 15/817,476

(22) Filed: Nov. 20, 2017

(65) Prior Publication Data

US 2019/0155409 A1  May 23, 2019

(51) Int. Cl.
| | |
|---|---|
| *G06F 3/0354* | (2013.01) |
| *G06F 3/038* | (2013.01) |
| *G06F 3/16* | (2006.01) |
| *G10L 21/0208* | (2013.01) |
| *H04R 1/02* | (2006.01) |
| *G10L 17/22* | (2013.01) |
| *H04L 29/08* | (2006.01) |
| *G06F 3/02* | (2006.01) |

(52) U.S. Cl.
CPC ........ *G06F 3/03545* (2013.01); *G06F 3/0383* (2013.01); *G06F 3/03547* (2013.01); *G06F 3/167* (2013.01); *G10L 17/22* (2013.01); *G10L 21/0208* (2013.01); *H04R 1/028* (2013.01); *G06F 3/0202* (2013.01); *G06F 2203/0381* (2013.01); *G06F 2203/0384* (2013.01); *H04L 67/12* (2013.01); *H04L 67/14* (2013.01)

(58) Field of Classification Search
None
See application file for complete search history.

(56) References Cited

U.S. PATENT DOCUMENTS

| 6,035,349 A * | 3/2000 | Ha ........................ G06F 13/124 |
| | | 710/68 |
| 2009/0251440 A1 * | 10/2009 | Edgecomb .......... G06F 3/03545 |
| | | 345/179 |

\* cited by examiner

*Primary Examiner* — Gustavo Polo
(74) *Attorney, Agent, or Firm* — Lin & Associates Intellectual Property, Inc.

(57) ABSTRACT

A multifunctional stylus with a voice control function includes a base body, a controller disposed in the base body, a microphone, an audio codec, an audio processor and a radio-frequency circuit. The microphone is controlled by the controller for converting acoustical signals into analog signals. The audio codec is electrically connected with the microphone. The analog signals are converted into digital signals. The audio processor is electrically connected with the audio codec and the controller. The digital signals are transmitted to the audio processor. The audio processor does a noise suppression processing on and compresses the digital signals. The radio-frequency circuit is electrically connected with the audio processor which is electrically connected with the controller. The digital signals are transmitted to the radio-frequency circuit. The radio-frequency circuit is used for transmitting the digital signals to a docking device.

18 Claims, 4 Drawing Sheets

MULTIFUNCTIONAL STYLUS WITH A VOICE CONTROL FUNCTION AND VOICE CONTROL METHOD APPLIED THEREIN

BACKGROUND OF THE INVENTION

1. Field of the Invention

The present invention generally relates to a stylus, and more particularly to a multifunctional stylus with a voice control function, and a voice control method applied in the multifunctional stylus with a voice control function.

2. The Related Art

With the prosperous development of electronics industry, kinds of portable mobile electronic equipment, such as cell phones and tablet personal computers, are increased day by day, and correspondingly, conventional styluses matched with the portable mobile electronic equipment are applied widely. However, the conventional styluses just be used in touching screens, each of the conventional styluses just has a single function that is incapable of satisfying diversified requirements of a consumer.

Thus, in order to solve the problem described above, an innovative multifunctional stylus with a voice control function and a voice control method applied in the innovative multifunctional stylus with a voice control function are essential to be provided so as to be capable of satisfying the diversified requirements of the consumer.

SUMMARY OF THE INVENTION

An object of the present invention is to provide a multifunctional stylus with a voice control function. The multifunctional stylus with a voice control function includes a base body, a controller disposed in the base body, a microphone, an audio codec, an audio processor and a radio-frequency circuit. The microphone is disposed in the base body. The microphone is electrically connected with and controlled by the controller for converting acoustical signals into analog signals. The audio codec is disposed in the base body. The audio codec is electrically connected with the microphone. The analog signals are transmitted from the microphone to the audio codec and are converted into digital signals. The audio processor is disposed in the base body. The audio processor is electrically connected with the audio codec and the controller. The audio processor is controlled by the controller. The digital signals are transmitted from the audio codec to the audio processor. The audio processor does a noise suppression processing on the digital signals transmitted by the audio codec and compresses the digital signals transmitted by the audio codec. The radio-frequency circuit is disposed in the base body. The radio-frequency circuit is electrically connected with the audio processor. The audio processor is electrically connected with the controller, so the radio-frequency circuit is electrically connected with the controller by the audio processor. The radio-frequency circuit is controlled by the controller. The digital signals processed and compressed by the audio processor are transmitted to the radio-frequency circuit. The radio-frequency circuit is used for transmitting the digital signals processed and compressed by the audio processor to a docking device so as to communicate with the docking device.

Another object of the present invention is to provide a voice control method applied in a multifunctional stylus with a voice control function. The multifunctional stylus with a voice control function includes a microphone, an audio codec, an audio processor, a radio-frequency circuit, an operation interface, and a controller controlling an operation of the microphone, the audio codec, the audio processor, the radio-frequency circuit and the operation interface. Specific steps of the voice control method are described hereinafter. Press the operation interface to generate action signals of a user. The operation interface collects the action signals, and transmits the action signals to the controller. The controller receives the action signals, and interprets and calculates the action signals. The user sends acoustical signals to the microphone. The controller controls the microphone to receive the acoustical signals and convert the acoustical signals into analog signals. The microphone transmits the analog signals to the audio codec. The audio codec receives the analog signals and converts the analog signals into digital signals. The audio codec transmits the digital signals to the audio processor. The audio processor receives the digital signals. The audio processor does a noise suppression processing on the digital signals and compresses the digital signals. The audio processor transmits the processed and compressed digital signals to the radio-frequency circuit. The radio-frequency circuit transmits the processed and compressed digital signals to a docking device so as to wirelessly communicate with the docking device.

Another object of the present invention is to provide a voice control method applied in a multifunctional stylus with a voice control function for controlling an internet of things device. The multifunctional stylus with a voice control function includes a microphone, an audio codec, an audio processor, a radio-frequency circuit, an operation interface, and a controller controlling an operation of the microphone, the audio codec, the audio processor, the radio-frequency circuit and the operation interface. Specific steps of the voice control method are described hereinafter. Operate a voice recognition application program recorded in a docking device to login an internet of things server in the docking device and register an internet of things device. Press the operation interface to generate action signals of a user. The operation interface collects the action signals, and transmits the action signals to the controller. The controller receives the action signals, and interprets and calculates the action signals. The user sends acoustical signals to the microphone. The controller controls the microphone to receive the acoustical signals and convert the acoustical signals into analog signals. The microphone transmits the analog signals to the audio codec. The audio codec receives the analog signals and converts the analog signals into digital signals. The audio codec transmits the digital signals to the audio processor. The audio processor receives the digital signals. The audio processor does a noise suppression processing on the digital signals and compresses the digital signals. The audio processor transmits the processed and compressed digital signals to the radio-frequency circuit. The radio-frequency circuit transmits the processed and compressed digital signals to the docking device for starting up the voice recognition application program. The docking device receives the processed and compressed digital signals, records the processed and compressed digital signals by the voice recognition application program in the docking device. A voice recognition server in the docking device recognizes the processed and compressed digital signals. The voice recognition server sends the recognized digital signals to the internet of things server in the docking device. The internet of things server sends the recognized digital signals to the internet of things device, so that the internet of things device is proceeded being controlled.

As described above, the multifunctional stylus with a voice control function not only provides a touching function by virtue of a touch sensor, but also provides a voice control function by virtue of the controller, the microphone, the audio codec, the audio processor, the radio-frequency circuit and the operation interface. Furthermore, the multifunctional stylus with a voice control function cooperates with the docking device to be used for controlling the internet of things device by virtue of the voice control function of the multifunctional stylus with a voice control function. As a result, the multifunctional stylus with a voice control function and the voice control method applied in the multifunctional stylus with a voice control function are provided so as to be capable of satisfying diversified requirements of a consumer.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
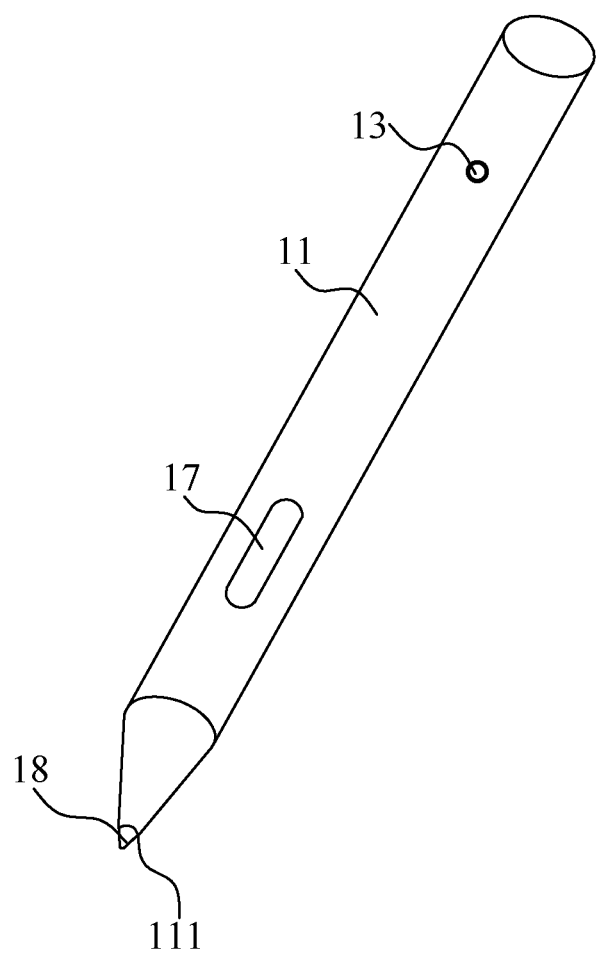
FIG. 1 is a diagrammatic drawing of a multifunctional stylus with a voice control function in accordance with a preferred embodiment of the present invention.
Figure 2:
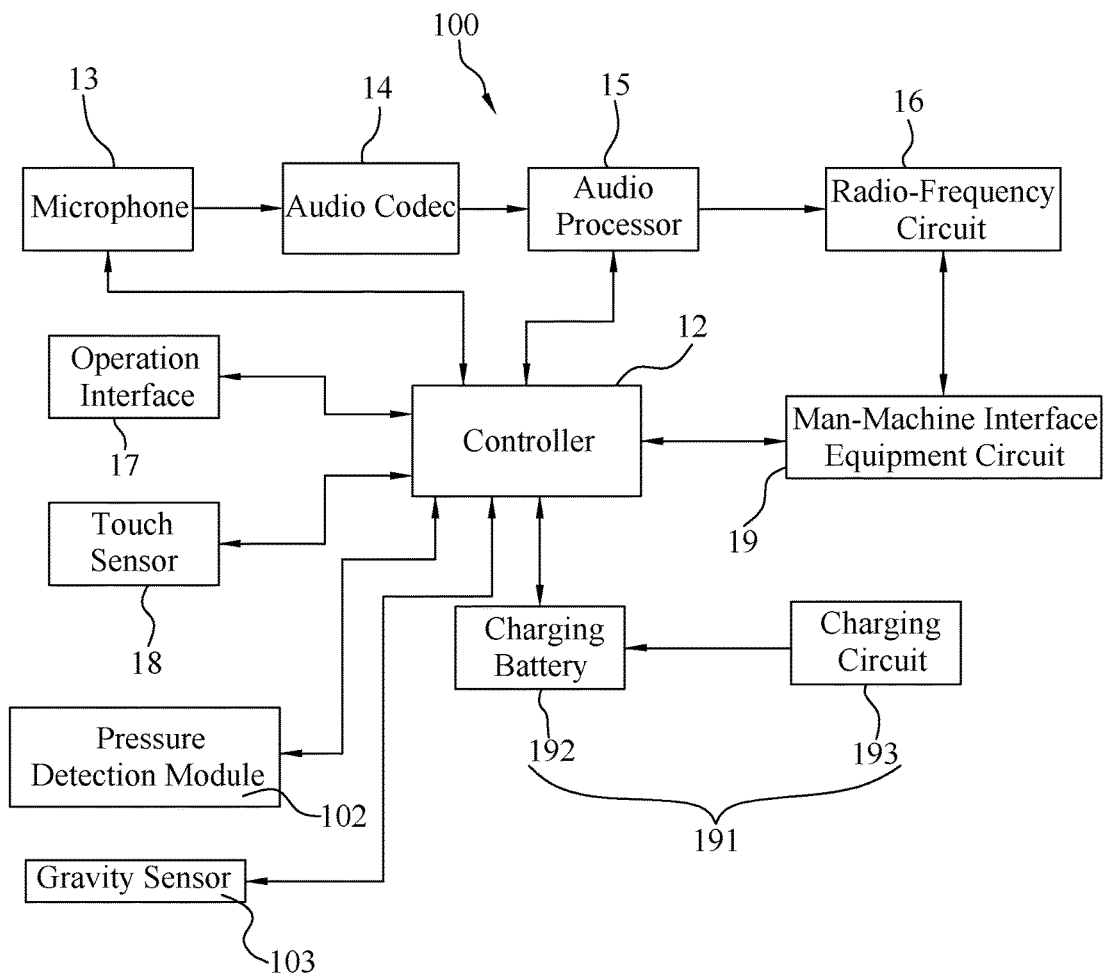
FIG. 2 is a block diagram of the multifunctional stylus with a voice control function of FIG. 1.
Figure 3:
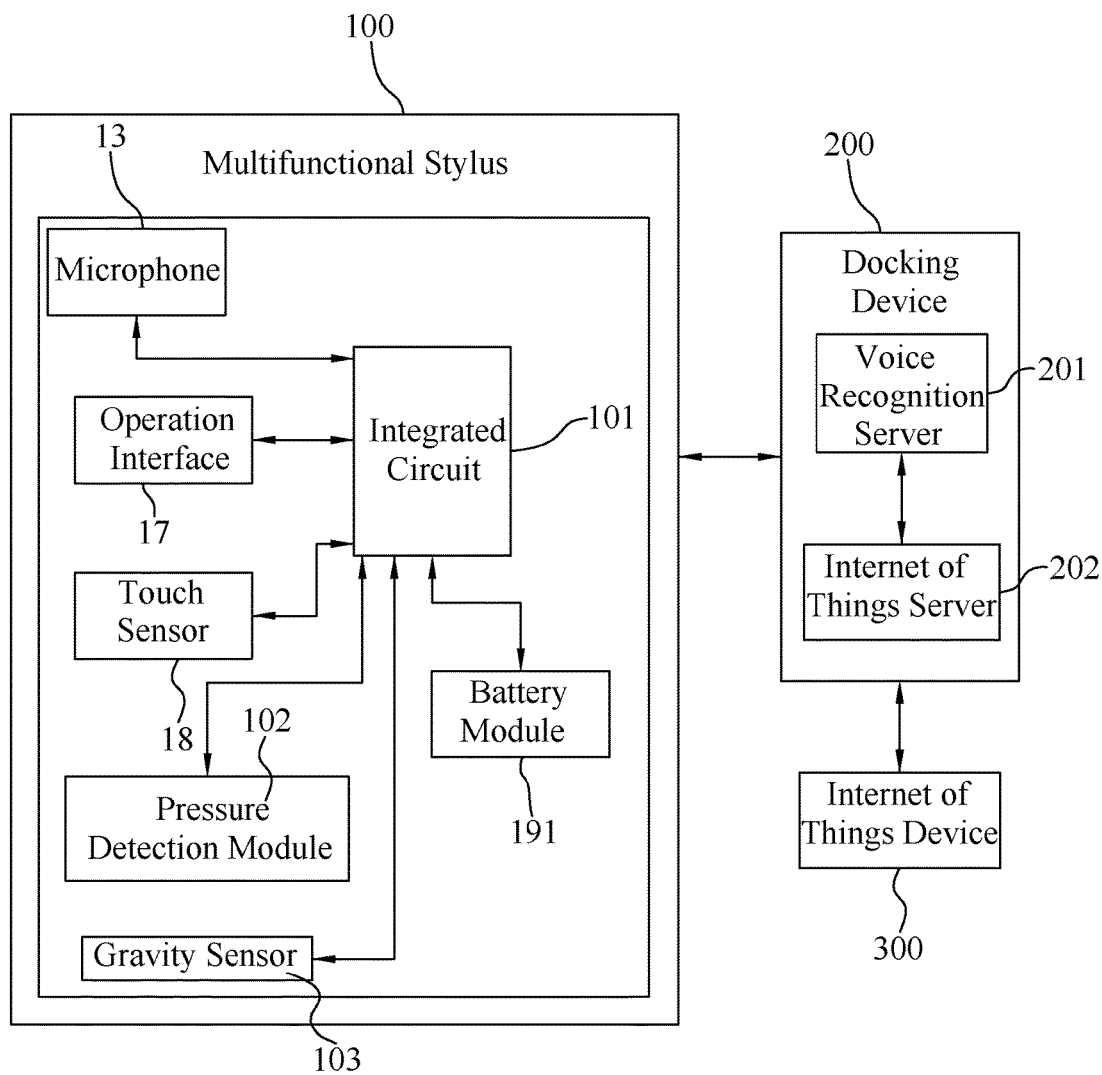
FIG. 3 is a block diagram of the multifunctional stylus with a voice control function of FIG. 1, wherein the multifunctional stylus with a voice control function cooperates with a docking device to be used for controlling an internet of things device.
Figure 4:
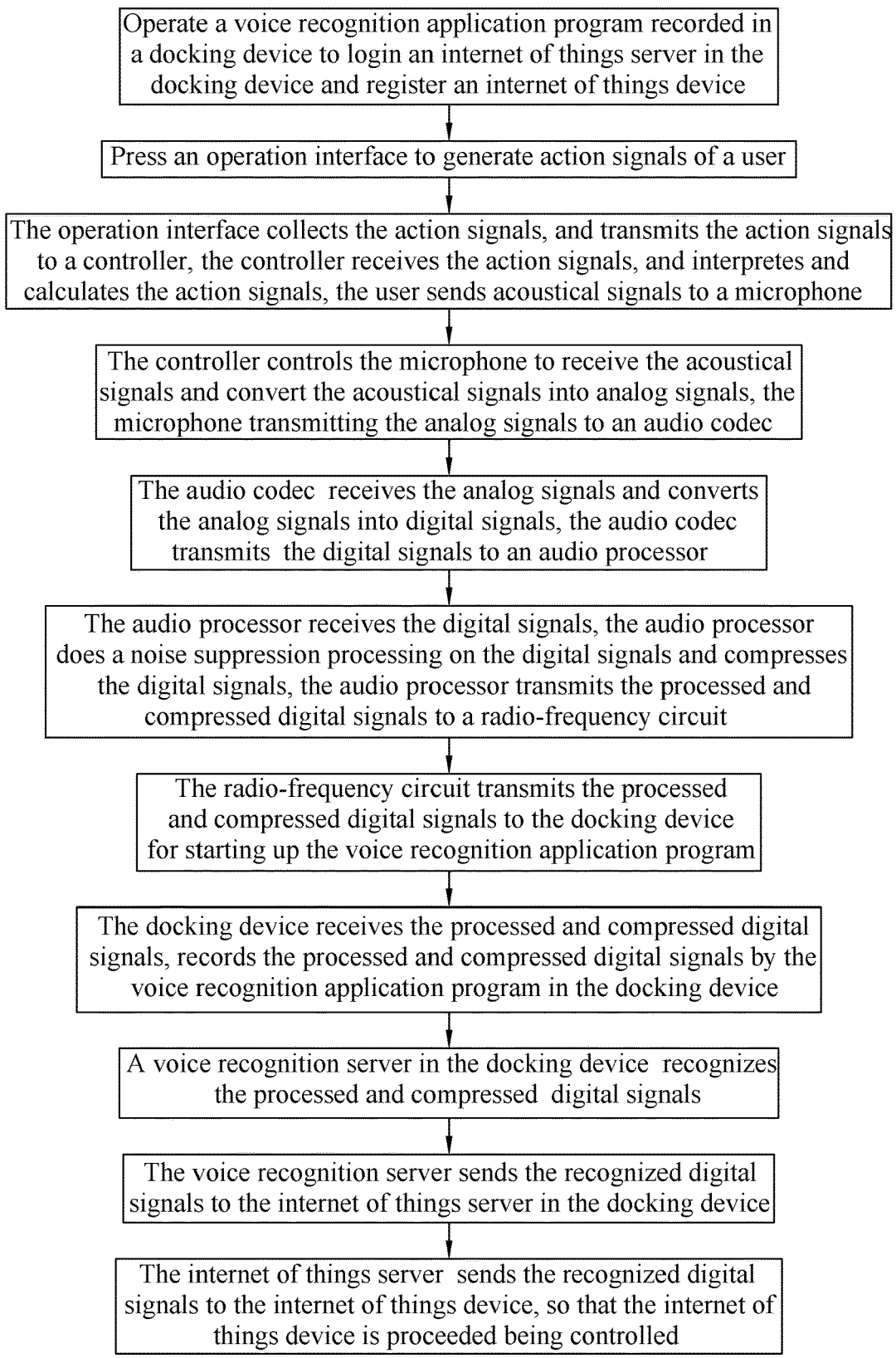
FIG. 4 is a flow chart of a voice control method applied in the multifunctional stylus with a voice control function.

With reference to FIG. 1 to FIG. 3, a multifunctional stylus with a voice control function 100 in accordance with a preferred embodiment of the present invention is shown. The multifunctional stylus with a voice control function 100 includes a base body 11, a controller 12, a microphone 13, an audio codec 14, an audio processor 15, a radio-frequency circuit 16, an operation interface 17, a touch sensor 18, a pressure detection module 102, a gravity sensor 103, a man-machine interface equipment circuit 19 and a battery module 191. The controller 12, the audio codec 14, the audio processor 15, the radio-frequency circuit 16 and the man-machine interface equipment circuit 19 are together designed into an integrated circuit 101. The controller 12 controls an operation of the microphone 13, the audio codec 14, the audio processor 15, the radio-frequency circuit 16, the operation interface 17, the touch sensor 18, the pressure detection module 102, the gravity sensor 103, the man-machine interface equipment circuit 19 and the battery module 191.

The controller 12 and the microphone 13 are both disposed in the base body 11. The microphone 13 is electrically connected with and controlled by the controller 12 for converting acoustical signals into analog signals. A user is capable of sending voice commands, namely the acoustical signals to the microphone 13 of the multifunctional stylus with a voice control function 100. In this preferred embodiment, the controller 12 is a micro controller unit (MCU). The audio codec 14 and the audio processor 15 are both disposed in the base body 11. The audio codec 14 is electrically connected with the microphone 13. The analog signals are transmitted from the microphone 13 to the audio codec 14, and the analog signals transmitted by the microphone 13 are converted into digital signals by the audio codec 14. The audio processor 15 is electrically connected with the audio codec 14 and the controller 12. The audio processor 15 is controlled by the controller 12. The digital signals are transmitted from the audio codec 14 to the audio processor 15. The audio processor 15 does a noise suppression processing on the digital signals transmitted by the audio codec 14 and compresses the digital signals transmitted by the audio codec 14. The digital signals processed and compressed by the audio processor 15 are transmitted to the radio-frequency circuit 16.

The radio-frequency circuit 16 is disposed in the base body 11. The radio-frequency circuit 16 is electrically connected with the audio processor 15. The audio processor 15 is electrically connected with the controller 12, so the radio-frequency circuit 16 is electrically connected with the controller 12 by the audio processor 15. The radio-frequency circuit 16 is controlled by the controller 12. The radio-frequency circuit 16 is used for transmitting the digital signals processed and compressed by the audio processor 15 to a docking device 200 so as to wirelessly communicate with the docking device 200. The docking device 200 is wirelessly connected with the multifunctional stylus with a voice control function 100 by virtue of the integrated circuit 101. In this preferred embodiment, the docking device 200 is wirelessly connected with the multifunctional stylus with a voice control function 100 by a bluetooth technology. The multifunctional stylus with a voice control function 100 is capable of triggering a voice assistant (not shown) of the docking device 200 by a voice recognition application program. The voice assistant is capable of one of Amazon Alexa, Google Assistant and Microsoft Cortana. In this preferred embodiment, the docking device 200 is a cell phone, a tablet computer or a notebook etc. The docking device 200 is equipped with a voice recognition server 201 and an internet of things server 202. In other case, the voice recognition server 201 and the internet of things server 202 are capable of being based on a cloud platform. The voice recognition server 201 is capable of being appropriate for the one of Amazon Alexa, Google Assistant and Microsoft Cortana. The voice commands are sent to the voice recognition server 201 by the multifunctional stylus with a voice control function 100. The operation interface 17 is disposed to the base body 11. The operation interface 17 is exposed to the base body 11. The operation interface 17 is a button. The operation interface 17 is electrically connected with and controlled by the controller 12. When the operation interface 17 is pressed, action signals of the user are generated. The operation interface 17 is used for collecting the action signals of the user, and the action signals are transmitted to the controller 12 for being interpreted and calculated.

The action signals and the digital signals are transmitted to the docking device 200 for starting up the voice recognition application program of the docking device 200. The voice recognition application program records the digital signals converted from the analog signals which are converted from the acoustical signals, namely the voice commands, and then sends the digital signals to the voice recognition server 201. Also, the voice recognition application program logins the internet of things server 202 and registers an internet of things device 300. Therefore, the voice recognition server 201 recognizes the voice commands and then controls the corresponding internet of things device 300 via the internet of things server 202. So the multifunctional stylus with a voice control function 100 provides a voice control function by virtue of the controller 12, the microphone 13, the audio codec 14, the audio processor 15, the radio-frequency circuit 16 and the operation interface 17.

One end of the base body 11 is of an inverted cone shape. The one end of the base body 11 opens a through-hole 111. The touch sensor 18 is disposed to the one end of the base body 11 for providing a touching function of the multifunctional stylus with a voice control function 100. The touch sensor 18 is exposed out of the base body 11 from the through-hole 111. The pressure detection module 102 and the gravity sensor 103 are both disposed in the base body 11. The pressure detection module 102 is capable of detecting a pressure afforded by the multifunctional stylus with a voice control function 100 according to a writing content effect of the multifunctional stylus with a voice control function 100. The gravity sensor 103 is capable of detecting a position of the multifunctional stylus with a voice control function 100 held by the user and a tilt angle of the multifunctional stylus with a voice control function 100 according to the writing content effect of the multifunctional stylus with a voice control function 100. The man-machine interface equipment circuit 19 is disposed in the base body 11. The touch sensor 18 and the man-machine interface equipment circuit 19 are electrically connected with and controlled by the controller 12. Touching information sensed by the touch sensor 18 is transmitted to the controller 12, after the touching information is interpreted and calculated, the touching information transmitted by the controller 12 is transmitted to the man-machine interface equipment circuit 19, after the touching information is coded by the man-machine interface equipment circuit 19, the touching information is transmitted to the radio-frequency circuit 16, the touching information is transmitted to the docking device 200 by the radio-frequency circuit 16 for recognizing and disposing the touching information to communicate with the docking device 200. Signals returned by the docking device 200 are transmitted to the man-machine interface equipment circuit 19.

The battery module 191 is disposed in the base body 11. The battery module 191 is electrically connected with and controlled by the controller 12. The battery module 191 includes a rechargeable battery 192 and a charging circuit 193. The rechargeable battery 192 is electrically connected with and controlled by the controller 12. The rechargeable battery 192 is capable of reducing troubles of the user exchanging primary batteries (not shown). The charging circuit 193 is electrically connected with the rechargeable battery 192 for charging and protecting the rechargeable battery 192.

Referring to FIG. 1 to FIG. 4, a voice control method in accordance with the preferred embodiment of the present invention is shown. The voice control method is applied in the multifunctional stylus with a voice control function 100 for controlling the internet of things device 300. The multifunctional stylus with a voice control function 100 cooperates with the docking device 200 to be used for controlling the internet of things device 300 by virtue of the voice control function of the multifunctional stylus with a voice control function 100. Specific steps of the voice control method applied in the multifunctional stylus with a voice control function 100 are described as follows.

Operate the voice recognition application program recorded in the docking device 200 to login the internet of things server 202 in the docking device 200 and register the internet of things device 300.

Press the operation interface 17 to generate the action signals of the user.

The operation interface 17 collects the action signals, and transmits the action signals to the controller 12, the controller 12 receives the action signals, and interprets and calculates the action signals, the user sends the acoustical signals to the microphone 13.

The controller 12 controls the microphone 13 to receive the acoustical signals and convert the acoustical signals into analog signals, the microphone 13 transmits the analog signals to the audio codec 14.

The audio codec 14 receives the analog signals and converts the analog signals into the digital signals, the audio codec 14 transmits the digital signals to the audio processor 15.

The audio processor 15 receives the digital signals, the audio processor 15 does a noise suppression processing on the digital signals and compresses the digital signals, the audio processor 15 transmits the processed and compressed digital signals to the radio-frequency circuit 16.

The radio-frequency circuit 16 transmits the processed and compressed digital signals to the docking device 200 so as to wirelessly communicate with the docking device 200 for starting up the voice recognition application program.

The docking device 200 receives the processed and compressed digital signals, records the processed and compressed digital signals by the voice recognition application program in the docking device 200.

The voice recognition server 201 in the docking device 200 recognizes the processed and compressed digital signals.

The voice recognition server 201 sends the recognized digital signals to the internet of things server 202 in the docking device 200.

The internet of things server 202 sends the recognized digital signals to the internet of things device 300, so that the internet of things device 300 is proceeded being controlled.

Referring to FIG. 1 to FIG. 4 again, when the multifunctional stylus with a voice control function 100 cooperates with the docking device 200 to be used for controlling the internet of things device 300 by virtue of the voice control function of the multifunctional stylus with a voice control function 100, specific steps of the voice control method applied in the multifunctional stylus with a voice control function 100 described as follows are needed. The internet of things device 300 is a television, a refrigerator or an air conditioner etc.

Register the internet of things server 202 in the docking device 200 and the internet of things device 300 before pressing the operation interface 17.

After the digital signals are processed and compressed by the audio processor 15, the docking device 200 receives the processed and compressed digital signals.

The voice recognition server 201 in the docking device 200 recognizes the processed and compressed digital signals.

The voice recognition server 201 sends the recognized digital signals to the internet of things server 202.

The internet of things server 202 sends the recognized digital signals to the internet of things device 300, so that the internet of things device 300 is proceeded being controlled.

As described above, the multifunctional stylus with a voice control function 100 not only provides the touching function by virtue of the touch sensor 18, but also provides the voice control function by virtue of the controller 12, the microphone 13, the audio codec 14, the audio processor 15, the radio-frequency circuit 16 and the operation interface 17.

Furthermore, the multifunctional stylus with a voice control function 100 cooperates with the docking device 200 to be used for controlling the internet of things device 300 by virtue of the voice control function of the multifunctional stylus with a voice control function 100. As a result, the multifunctional stylus with a voice control function 100 and the voice control method applied in the multifunctional stylus with a voice control function 100 are provided so as to be capable of satisfying diversified requirements of a consumer.

What is claimed is:

1. A multifunctional stylus with a voice control function, comprising:
   a base body;
   a controller disposed in the base body;
   a microphone disposed in the base body, the microphone electrically connected with and controlled by the controller for converting acoustical signals into analog signals;
   an audio codec disposed in the base body, the audio codec electrically connected with the microphone, the analog signals being transmitted from the microphone to the audio codec and being converted into digital signals;
   an audio processor disposed in the base body, the audio processor being electrically connected with the audio codec and the controller, the audio processor being controlled by the controller, the digital signals being transmitted from the audio codec to the audio processor, the audio processor doing a noise suppression processing on the digital signals transmitted by the audio codec and compressing the digital signals transmitted by the audio codec;
   a radio-frequency circuit disposed in the base body, the radio-frequency circuit being electrically connected with the audio processor, the audio processor being electrically connected with the controller, so the radio-frequency circuit being electrically connected with the controller by the audio processor, the radio-frequency circuit being controlled by the controller, the digital signals processed and compressed by the audio processor being transmitted to the radio-frequency circuit, the radio-frequency circuit being used for transmitting the digital signals processed and compressed by the audio processor to a docking device so as to wirelessly communicate with the docking device; and
   an operation interface disposed to and exposed to the base body, the operation interface being electrically connected with and controlled by the controller, the operation interface being used for collecting action signals of a user, and the action signals being transmitted to the controller for being interpreted and calculated.

2. The multifunctional stylus with a voice control function as claimed in claim 1, wherein the operation interface is a button.

3. The multifunctional stylus with a voice control function as claimed in claim 1, further comprising a touch sensor and a man-machine interface equipment circuit, the touch sensor being disposed to one end of the base body for providing a touching function of the multifunctional stylus with a voice control function, the man-machine interface equipment circuit being disposed in the base body, the touch sensor and the man-machine interface equipment circuit being electrically connected with and controlled by the controller, touching information sensed by the touch sensor being transmitted to the controller, after the touching information is interpreted and calculated, the touching information transmitted by the controller being transmitted to the man-machine interface equipment circuit, after the touching information is coded by the man-machine interface equipment circuit, the touching information being transmitted to the radio-frequency circuit, and the touching information being transmitted to the docking device by the radio-frequency circuit.

4. The multifunctional stylus with a voice control function as claimed in claim 3, wherein the one end of the base body opens a through-hole, and the touch sensor is exposed out of the base body from the through-hole.

5. The multifunctional stylus with a voice control function as claimed in claim 3, wherein the controller, the audio codec, the audio processor, the radio-frequency circuit and the man-machine interface equipment circuit are together designed into an integrated circuit.

6. The multifunctional stylus with a voice control function as claimed in claim 5, wherein the docking device is wirelessly connected with the multifunctional stylus with a voice control function by virtue of the integrated circuit.

7. The multifunctional stylus with a voice control function as claimed in claim 1, further comprising a battery module disposed in the base body, the battery module being electrically connected with and controlled by the controller.

8. The multifunctional stylus with a voice control function as claimed in claim 7, wherein the battery module includes a rechargeable battery and a charging circuit, the rechargeable battery is electrically connected with and controlled by the controller, and the charging circuit is electrically connected with the rechargeable battery for charging and protecting the rechargeable battery.

9. The multifunctional stylus with a voice control function as claimed in claim 1, wherein the docking device is wirelessly connected with the multifunctional stylus with a voice control function by a bluetooth technology.

10. The multifunctional stylus with a voice control function as claimed in claim 1, wherein the controller is a micro controller unit.

11. The multifunctional stylus with a voice control function as claimed in claim 1, further comprising a pressure detection module and a gravity sensor which are both disposed in the base body, the pressure detection module being capable of detecting a pressure afforded by the multifunctional stylus with a voice control function according to a writing content effect of the multifunctional stylus with a voice control function, the gravity sensor being capable of detecting a position of the multifunctional stylus with a voice control function held by a user and a tilt angle of the multifunctional stylus with a voice control function according to the writing content effect of the multifunctional stylus with a voice control function.

12. A voice control method applied in a multifunctional stylus with a voice control function, the multifunctional stylus with a voice control function including a microphone, an audio codec, an audio processor, a radio-frequency circuit, an operation interface, and a controller controlling an operation of the microphone, the audio codec, the audio processor, the radio-frequency circuit and the operation interface, the voice control method comprising the steps of:
   pressing the operation interface to generate action signals of a user;
   the operation interface collecting the action signals, and transmitting the action signals to the controller, the controller receiving the action signals, and interpreting and calculating the action signals, the user sending acoustical signals to the microphone;
   the controller controlling the microphone to receive the acoustical signals and convert the acoustical signals into analog signals, the microphone transmitting the analog signals to the audio codec;

the audio codec receiving the analog signals and converting the analog signals into digital signals, the audio codec transmitting the digital signals to the audio processor;

the audio processor receiving the digital signals, the audio processor doing a noise suppression processing on the digital signals and compressing the digital signals, the audio processor transmitting the processed and compressed digital signals to the radio-frequency circuit;

the radio-frequency circuit transmitting the processed and compressed digital signals to a docking device so as to wirelessly communicate with the docking device;

registering an internet of things server in the docking device and an internet of things device before pressing the operation interface;

after the digital signals are processed and compressed by the audio processor, the docking device receiving the processed and compressed digital signals;

a voice recognition server in the docking device recognizing the processed and compressed digital signals;

the voice recognition server sending the recognized digital signals to the internet of things server; and the internet of things server sending the recognized digital signals to the internet of things device, so that the internet of things device is controlled.

13. The voice control method as claimed in claim 12, wherein the internet of things device is a television.

14. The voice control method as claimed in claim 12, wherein the internet of things device is a refrigerator.

15. The voice control method as claimed in claim 12, wherein the internet of things device is an air conditioner.

16. A voice control method applied in a multifunctional stylus with a voice control function for controlling an internet of things device, the multifunctional stylus with a voice control function including a microphone, an audio codec, an audio processor, a radio-frequency circuit, an operation interface, and a controller controlling an operation of the microphone, the audio codec, the audio processor, the radio-frequency circuit and the operation interface, the voice control method comprising the steps of:

operating a voice recognition application program recorded in a docking device to login an internet of things server in the docking device and register an internet of things device;

pressing the operation interface to generate action signals of a user;

the operation interface collecting the action signals, and transmitting the action signals to the controller, the controller receiving the action signals, and interpreting and calculating the action signals, the user sending acoustical signals to the microphone;

the controller controlling the microphone to receive the acoustical signals and convert the acoustical signals into analog signals, the microphone transmitting the analog signals to the audio codec;

the audio codec receiving the analog signals and converting the analog signals into digital signals, the audio codec transmitting the digital signals to the audio processor;

the audio processor receiving the digital signals, the audio processor doing a noise suppression processing on the digital signals and compressing the digital signals, the audio processor transmitting the processed and compressed digital signals to the radio-frequency circuit;

the radio-frequency circuit transmitting the processed and compressed digital signals to the docking device for starting up the voice recognition application program;

the docking device receiving the processed and compressed digital signals, recording the processed and compressed digital signals by the voice recognition application program in the docking device;

a voice recognition server in the docking device recognizing the processed and compressed digital signals;

the voice recognition server sending the recognized digital signals to the internet of things server in the docking device; and the internet of things server sending the recognized digital signals to the internet of things device, so that the internet of things device is controlled.

17. The voice control method as claimed in claim 16, wherein the voice recognition server and the internet of things server are capable of being based on a cloud platform.

18. The voice control method as claimed in claim 16, wherein the voice recognition server is capable of being appropriate for one of Amazon Alexa, Google Assistant and Microsoft Cortana.

* * * * *